(12) United States Patent
Wolleschensky et al.

(10) Patent No.: US 9,791,686 B2
(45) Date of Patent: Oct. 17, 2017

(54) HIGH-RESOLUTION SCANNING MICROSCOPY

(71) Applicant: Carl Zeiss Microscopy GmbH, Jena (DE)

(72) Inventors: Ralf Wolleschensky, Jena (DE); Ingo Kleppe, Jena (DE); Ralf Netz, Jena (DE); Christoph Nieten, Jena (DE)

(73) Assignee: Carl Zeiss Microscopy GMBH, Jena (DE)

( * ) Notice: Subject to any disclaimer, the term of this patent is extended or adjusted under 35 U.S.C. 154(b) by 0 days.

(21) Appl. No.: 15/457,486

(22) Filed: Mar. 13, 2017

(65) Prior Publication Data

US 2017/0184834 A1     Jun. 29, 2017

Related U.S. Application Data

(63) Continuation of application No. 14/373,602, filed as application No. PCT/EP2013/053980 on Feb. 27, 2013, now Pat. No. 9,632,296.

(30) Foreign Application Priority Data

Mar. 15, 2012   (DE) .................. 10 2012 204 128

(51) Int. Cl.
    *G02B 21/00*   (2006.01)
    *G02B 21/36*   (2006.01)
    *G02B 6/08*    (2006.01)

(52) U.S. Cl.
    CPC ............ *G02B 21/361* (2013.01); *G02B 6/08* (2013.01); *G02B 21/008* (2013.01); *G02B 21/0032* (2013.01); *G02B 21/0072* (2013.01)

(58) Field of Classification Search
    CPC .............. G02B 21/002; G02B 21/0032; G02B 21/0052; G02B 21/008
    USPC .......... 250/221, 234–236; 359/368, 380, 385
    See application file for complete search history.

(56) References Cited

U.S. PATENT DOCUMENTS

2016/0131883 A1*   5/2016   Kleppe .............. G02B 21/0072
                                                                    348/79

\* cited by examiner

*Primary Examiner* — Kevin Pyo
(74) *Attorney, Agent, or Firm* — Duane Morris LLP (57) ABSTRACT

In a microscope for high resolution scanning microscopy of a sample, said microscope comprising—an illumination device for illuminating the sample, —an imaging device for scanning at least one point spot or line spot across the sample and for imaging the point spot or line spot into a diffraction-limited, stationary single image with magnification into a detection plane, —a detector device for detecting the single image in the detection plane for different scanning positions with a spatial resolution, which, taking into consideration the magnification, is at least twice as high as a full width at half maximum of the diffraction-limited single image, —an evaluation device for evaluating a diffraction pattern of the single image for the scanning positions from data of the detector device and for generating an image of the sample, said image having a resolution that is increased beyond the diffraction limit, provision is made for—the detector device to have a detector array, which has pixels and is larger than the single image, and—a non-imaging redistribution element, which is disposed upstream of the detector array and distributes the radiation from the detection plane in a non-imaging manner among the pixels of the detector array.

1 Claim, 6 Drawing Sheets

HIGH-RESOLUTION SCANNING MICROSCOPY

RELATED APPLICATIONS

The present application is a continuation application of U.S. National Stage application Ser. No. 14/373,602 filed on Jul. 21, 2014, which depends from International PCT Application No. PCT/EP2013/053980, which was filed on Feb. 27, 2013, and the present application further claims priority benefit of U.S. Provisional Application No. 62/025,643 filed on Jul. 17, 2014, the contents of each are hereby incorporated by reference in their entirety.

FIELD OF THE INVENTION

The invention relates to a microscope for high resolution scanning microscopy of a sample, said microscope including an illumination device for illuminating the sample, an imaging device for scanning a point spot or line spot across the sample and for imaging the point spot or line spot into a diffraction-limited, stationary single image with magnification into a detection plane. Also included is a detector device for detecting the single image in the detection plane for different scanning positions with a spatial resolution, which, taking into consideration the magnification, is at least twice as high as a full width at half maximum of the diffraction-limited single image. An evaluation device for evaluating a diffraction pattern of the single image for the scanning positions from data of the detector device and for generating an image of the sample is also included. The image has a resolution that is increased beyond the diffraction limit. Furthermore, the invention relates to a method for high resolution scanning microscopy of a sample, in which method a sample is illuminated; a point spot or line spot, which is guided across the sample so as to scan it, is imaged into a single image. The spot is imaged in a diffraction limited manner into the single image with magnification, and the single image lies still in a detection plane. The single image is detected for different scanning positions with a spatial resolution, which, taking into consideration the magnification, is at least twice as high as a full width at half maximum of the diffraction-limited single image, so that a diffraction pattern of the single image is detected. The diffraction pattern of the single image is evaluated for each scanning position, and an image of the sample is generated that has a resolution that is increased beyond the diffraction limit.

BACKGROUND OF THE INVENTION

Such a microscope and/or microscopy method are or is known, for example, from the publication of C. Müller and J. Enderlein, Physical Review Letters, 104, 198101 (2010), or the EP 2317362 A1, which also cites additional references to the prior art.

This approach achieves an increase in resolution by imaging a spot in a diffraction limited manner onto a detection plane. The diffraction-limited image images a point spot as an Airy disk.

This diffraction disk is detected in the detection plane in such a way that its structure can be resolved. Based on the imaging performance of the microscope, the result is an overscanning on the part of the detector. When imaging a point spot, the form of the Airy disk is resolved. The resolution can be increased by a factor of 2 beyond this diffraction limit by suitably evaluating the diffraction pattern, which is described in the aforementioned steps and the disclosure of which is hereby incorporated in its entirety.

At the same time, however, it is unavoidable on the detection side that for each point, which is scanned on the sample in this manner, compared to a conventional laser scanning microscope (hereinafter also referred to by the acronym LSM), a single image has to be captured with a plethora of image data. If the structure of the single image of the spot is detected, for example, with 16 pixels, then each spot would have not only 16 times the amount of data, but also a single pixel would have an average of only $1/16$ of the radiation intensity that would fall on the detector of an LSM during a conventional pinhole detection. Since the radiation intensity is, of course, not uniformly distributed throughout the structure of the single image, for example, the Airy disk, the radiation intensity at the edge of this structure is actually much less than the mean value of $1/n$ for n pixels.

Therefore, one is faced with the problem of the detector being able to achieve a high resolution detection of radiation quantities. Conventional CCD (charge coupled diodes) arrays, which are commonly used in microscopy, do not achieve a sufficient signal-to-noise ratio, so that even an extension of the image acquisition time, which by itself would already be a disadvantage in the application, would not help. APD (avalanche photodiode) arrays are also subject to excessive levels of dark noise, so that even an extension of the measuring time would result in an insufficient signal-to-noise ratio. The same applies to CMOS detectors, which are also disadvantageous with respect to the size of the detector element, because the diffraction-limited single image of the spot would fall on too few pixels. PMT (photo multiplier tube) arrays are also associated with similar design space problems. In this case the pixels are too large. Therefore, the design space problems are based, in particular, on the fact that a high resolution microscope can be realized in terms of the development effort and the distribution of the device, only if integration into existing LSM designs were possible. In such microscopes, however, specific sizes of the single image are specified. A detector, which is larger in terms of area, could be incorporated, only if it were possible to provide, in addition, an optical system that once again significantly expands the image by several orders of magnitude. Such an optical system is expensive and complicated in its design, if the objective is to obtain a diffraction-limited pattern without additional aberrations.

Other methods that avoid the above described problems associated with the high resolution detection are also known from the prior art. For example, the EP 1157297 B1 discloses a method that exploits nonlinear processes by means of structured illumination. A structured illumination is moved across the sample in a plurality of rotational and spatial positions; and the sample is imaged in these different states on a wide field detector, for which the described limitations do not exist.

A method, which also achieves a high resolution (i.e., a resolution of a sample image beyond the diffraction limit) without the described limitations of the detector, is known from the WO 2006127692 and the DE 10 2006021317. This method, which is known by the acronym PALM [Photo Activated Localization Microscopy], uses a marker substance that can be activated by means of an optical activation signal. Only when the marker is in the activated state is it possible for the marker substance to be excited with excitation radiation to emit a certain fluorescence radiation; even when exposed to excitation radiation, non-activated molecules do not emit any fluorescence radiation. Thus, the activation radiation switches the activating substance into a state, in which it can be excited to fluoresce. Therefore, one generally speaks of a switch-over signal. At this point this switch-over signal is applied in such a way that at least a certain proportion of the activated marker molecules are spaced apart from the adjacent marker molecules, which are also activated in such a way that the activated marker molecules, measured on the basis of the optical resolution of microscopy, are separated or can be subsequently separated. This procedure is referred to as isolating the activated molecules. For these isolated molecules it is easy to determine the center of their resolution-limited radiation distribution and, based thereon, to computationally determine the location of the molecules with higher accuracy than the optical imaging actually allows. In order to image the entire sample, the PALM method exploits the fact that the probability of a marker molecule being activated by the switch-over signal of a given intensity is the same for all marker molecules. Hence, the intensity of the switch-over signal is applied in such a way that the desired isolation occurs. These process steps are repeated until as many of the marker molecules as possible are included once in a subset that was excited to fluoresce.

Therefore, an object of the invention is to provide a microscope and/or a microscopy method, with which a high resolution can also be achieved. In particular, the objective is to enable fast image acquisition with high resolution microscopy.

The invention achieves this engineering object by means of a microscope of the type described in the introductory part, wherein the detector device has: a detector array, which has pixels and is larger than the single image, and a non-imaging redistribution element, which is disposed upstream of the detector array and which distributes the radiation from the detection plane in a non-imaging manner among the pixels of the detector array.

The invention achieves this engineering object by means of a method of the type, described in the introductory part, by providing a detector array that has pixels and is larger than the single image, and by redistributing the radiation of the single image from the detection plane in a non-imaging manner among the pixels of the detector array.

The detection plane is conjugate in relation to the plane of the spot in the sample and corresponds to the pinhole plane of a normal LSM.

In accordance with the invention, the spot, which is scanned onto the sample, is imaged into a detection plane in such a way that said spot is quiescent. Then the radiation from the detection plane is redistributed in a non-imaging manner and directed onto the detector array. In this case the term "non-imaging" is based on the single image that is present in the detection plane. It goes without saying that individual surface areas of this single image can be imaged according to the laws of imaging. However, in this respect it is certainly possible for the imaging optical system to be located between the detector array and the redistribution element. However, the single image, which is present in the detection plane, is not preserved as such during the redistribution.

The term "diffraction limited" is not to be limited to the diffraction limit according to the Abbe theory, but is also to covers cases, in which due to concrete shortcomings or limitations, the theoretical maximum is missed by 20%. Even then, the single image has a structure that is referred to herein as a diffraction pattern. This diffraction pattern is overscanned.

This principle makes it possible to use a detector array that does not fit in its size to the single image. The detector array is larger or smaller than the single image to be detected in at least one expansion. The concept "different geometric design" includes both a different expansion of the detector array as well as an arrangement with a different aspect ratio, based on the height and the width of the expansion of the single image in the detection plane. In addition, the pixels of the detector array can also be too large for the necessary resolution. At this point it is also allowed that the contour of the pixel arrangement of the detector array be basically different from the contour of the single image in the detection plane. Finally, the detector array has, according to the invention, a different size than the single image in the detection plane. The redistribution in the method or more specifically the redistribution element in the microscope makes it possible to select a detector array without having to take into consideration the dimensional limitations and the pixel size restrictions, caused by the single image and its size. In particular, a detector line may be used as the detector array.

The image of the sample is created from a plurality of single images in the conventional LSM manner by scanning the sample with the spot; each of these single images is assigned a different scanning location, i.e., a different scanning position.

The concept, according to the invention, can be carried out simultaneously in a parallelized form for a plurality of spots, a method that is known for laser scanning microscopy. Then a plurality of spots on the sample are sampled in a scanning manner, and the single images of the plurality of spots lie still next to one another in the plane of detection. Then they are redistributed by either a common redistribution element, which is sufficiently large in terms of area, or by a plurality of redistribution elements and are then directed to one or more correspondingly larger individual detector arrays.

The following description focuses, as an example, on scanning with a single point spot. However, this approach is not to be construed as a restriction, and the elucidated features and principles also apply mutatis mutandis to the parallel scanning of several point spots as well as to the use of a line spot. The latter is, of course, only diffraction limited at right angles to the line extension, so that the relevant features of this description apply then only to one direction (transversely to the line extension).

SUMMARY OF THE INVENTION

The procedure of the invention makes it possible to carry out the LSM method at a satisfactory speed and with a reasonable amount of equipment. The invention opens up a wide field of applications that did not exist to date for the practice of high resolution microscopy.

One possibility for implementing the redistribution and/or the redistribution element is to use a bundle of optical fibers. These optical fibers can be designed preferably as multi-mode optical fibers. The bundle has an input, which is arranged in the detection plane, and in its contour is sufficient for the expansions of the diffraction-limited single image in the detection plane. At the output, however, the optical fibers are arranged in the geometrical arrangement, which is defined by the detector array, and which is different from that of the input. In this case the output-sided ends of the optical fibers can be guided directly onto the pixels of the detector array. It is especially advantageous, if the output of the bundle is held together in a plug, which can be easily fitted onto a detector line, for example an APD or PMT line.

For a better understanding of the invention, it is important to distinguish between the pixels of the detector array and the image pixels, with which the single image is resolved in the detection plane. Each image pixel is usually assigned to exactly one pixel of the detector array, but with respect to their arrangement the two pixels are different. A distinctive feature of the invention is, among other things, that the radiation at the image pixels is received in the detection plane, and the size and the arrangement of these image pixels cause an overscanning of the single image. In this way the structure of the single image is resolved, and since this single image is generated in a diffraction limited manner, the structure of said single image is the diffraction pattern. The redistribution element has an input side, at which said image pixels are provided. The input side is located in the detection plane. The redistribution element directs the radiation at each image pixel to one of the pixels of the detector array. The allocation of image pixels to pixels of the detector array is not maintained by the image structure, for which reason the redistribution is non-imaging in relation to the single image. Therefore, the invention may also be characterized in that in a microscope conforming to its genre, the detector device comprises a non-imaging redistribution element, which comprises an input side, which is located in the detection plane, and at this input side the radiation is received with the image pixels. Furthermore, the redistribution element comprises an output side, at which the radiation, which is received at the image pixels, is directed to the pixels of a detector array, whereby the radiation from the input side is redistributed to the output side in a non-imaging manner in relation to the single image. Analogously the method, according to the invention, may be characterized in that in a method conforming to its genre, the radiation is received in the detection plane with image pixels, which are redistributed among pixels of the detector array in a non-imaging manner in relation to the single image. The detector array differs with respect to the arrangement and/or the size of its pixels from the arrangement and/or the size of the image pixels in the detection plane. Furthermore, the image pixels in the detection plane are provided by the redistribution element in such a way that the diffraction pattern of the single image is overscanned, based on the diffraction limit.

In highly sensitive detector arrays it is known that when adjacent pixels exhibit large differences in the intensity of radiation, they show interference due to cross talk. In order to avoid such a problem, preference is given to a further development, wherein the optical fibers run from the input to the output in such a way that the optical fibers that are adjacent to each other at the output are also adjacent to each other at the input. Since the diffraction-limited single image shows no abrupt changes in the intensity of the radiation, such a design of the redistribution element automatically ensures that the adjacent pixels of the detector array have the smallest possible difference in intensity of radiation, a feature that minimizes the cross talk.

Instead of a redistribution based on optical fibers, it is also possible to provide the redistribution element with a mirror that has mirror elements with varying degrees of tilt. Such a mirror may be designed, for example, as a multi-faceted mirror, a DMD (digital mirror device) or as an adaptive mirror, wherein in the case of the latter two variants a suitable setting or more specifically actuation ensures the tilt of the mirror elements. The mirror elements direct the radiation from the detection plane onto the pixels of the detector array, which has a geometric configuration that is different from that of the mirror elements.

The mirror elements render, like the optical fiber ends in the input to the fiber optic bundle, the image pixels in terms of the resolution of the diffraction pattern of the single image, the size of said image pixel being the decisive factor for the overscan, not (no longer) the pixel size of the detector array. In this case a group composed of a plurality of individual detectors may also be understood to be the detector array, since they are always different in arrangement (i.e., larger) than the image pixels in the detector plane.

Various objective lenses are used, as a function of the desired resolution, in the laser scanning microscope. Changing an objective lens changes the expansion of a single image in the detection plane. Therefore, it is preferred to dispose a zoom optical system upstream of the detection plane in the imaging direction, in order to adjust the size of the single image to that of the detector device. Such a zoom optical system varies the size of the single image in a percentage range that is significantly less than 100%, therefore, much easier to carry out than a magnification of the size of the single image, which was described as a disadvantage in the introduction.

The sample is also illuminated preferably, as in a conventional LSM, in a scanning manner, although this is not mandatory. Then, however, it is possible to achieve a maximum increase in resolution. If the sample is illuminated in a scanning manner, then it is desirable for the illumination device and the imaging device to have a common scanning device, which guides a light spot across the sample and at the same time over the spot that is coincident with the light spot, where the sample is imaged, once again so as to be descanned in relation to the detector, so that the single image is quiescent in the detection plane. In such a configuration, the zoom optical system can be put into the common part of the illumination and imaging device. Then such a device allows not only the single image to be adjusted to the size of the detector in the detection plane, but also allows, in addition, the available illumination radiation to be completely coupled into the objective pupil, which may vary with the choice of objective lens, without any edge losses.

A radiation intensity-dependent cross talk between adjacent pixels of the detector array can be reduced, as already stated in the introduction, in the course of the redistribution by means of fiber optic bundles by suitably arranging the optical fibers in the bundle. In addition or as an alternative, it is also possible to perform a calibration. For this purpose each optical fiber is exposed, one after the other, to radiation; and the interference signal in adjacent pixels is detected. Such an approach makes it possible to construct a calibration matrix, with which during subsequent microscopy of the sample, a radiation intensity-dependent cross talk between adjacent pixels is corrected.

In addition, the resolution of the diffraction pattern of the single image also makes it possible to determine the direction, in which the spot is moving and along which movement occurs in the course of scanning the sample. Although this direction of movement is known, in principle, from the mechanism of the scanner (such as a scanning mirror or a movable sample table), there are in this case residual inaccuracies caused by the mechanism. These inaccuracies can be eliminated by evaluating the signals of the individual pixels of the detector array by means of cross correlation, which makes use of the fact that, based on the adjacent image pixels in the sample, the signals overlap to some extent due to the diffraction-limited imaging of the spot, but their centers lie side by side. If the signals of such image pixels are subjected to a cross correlation, then it is possible to reduce and/or totally eliminate a residual inaccuracy, which remains due to the unavoidable tolerances of the scanning mechanism.

In addition to the higher resolution, a temporal variation of the fluorescence in the detection volume, detected by the spot, can be detected by means of a spatial and temporal correlation of the signals from a series of measurements of the individual detector elements (assigned to the image pixels in the detection plane). For example, diffusion coefficients can be determined from a temporal correlation, as in fluorescence correlation spectroscopy; and also diffusion, directed between image pixels, and diffusion barriers can be visualized through the inclusion of the spatial correlation. In addition and beyond this feature, the movement sequences of the fluorescent molecules are of great interest for tracking applications, because the light spot is supposed to track the movement of the fluorescent molecules. The arrangement, described herein, makes it possible to determine with very high accuracy the direction of movement even within a pixel illumination period. Therefore, it is preferred as a further development that variations in the sample be detected by determining and evaluating a temporal variation of the diffraction-limited single image, when the point spot or the line spot is quiescent in the sample.

Moreover, the procedure, according to the invention, allows the distribution of the illumination to be modified during scanned illumination, for example, by means of a phase filter. In this way it is very easy to implement the method with such a phase filter, as described in Gong et al., Opt. Let., 34, 3508 (2009).

In so far as a method is described herein, a control device executes these process steps, when the microscope is in operation.

It goes without saying that the aforementioned features and those to be explained below can be used not only in the specified combinations, but also in other combinations or alone without departing from the scope of the present invention.

BRIEF DESCRIPTION OF THE DRAWINGS

The invention is explained in greater detail below, for example, with reference to the accompanying drawings, which also disclose features that are essential to the invention. The drawings show in.

DESCRIPTION OF THE EMBODIMENTS

Figure 1:
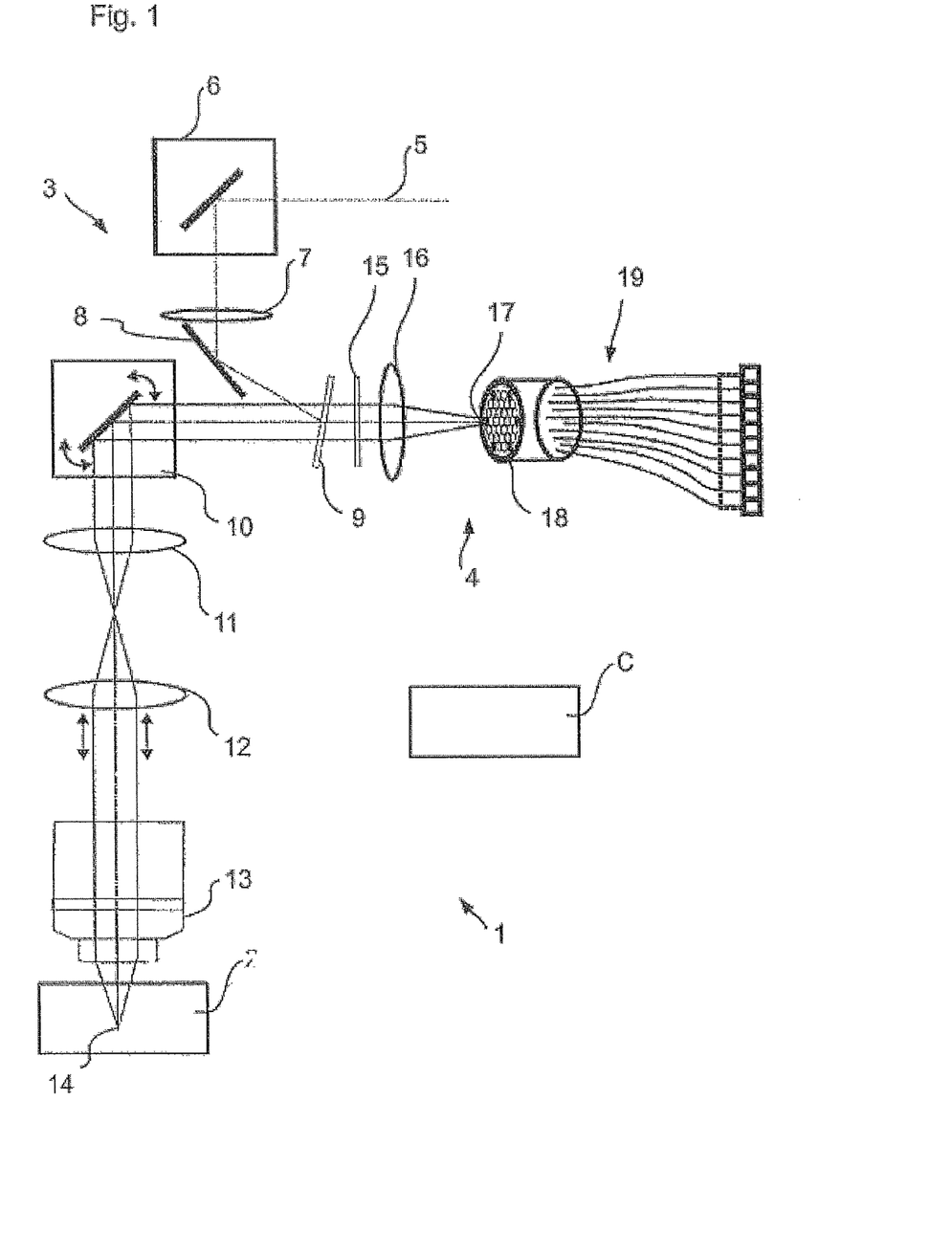
FIG. 1 is a schematic representation of a laser scanning microscope for high resolution microscopy.

FIG. 1 shows in schematic form a laser scanning microscope 1, which is designed for microscopying a sample 2. The laser scanning microscope 1 (hereinafter also referred to by the acronym LSM) is controlled by means of a control device C and has an illumination beam path 3 as well as an imaging beam path 4. The illumination beam path illuminates a spot in the sample 2, and the imaging beam path 4 images this spot in a diffraction limited manner for detection. The illumination beam path 3 and the imaging beam path 4 share a plurality of elements. However, this is no more mandatory than a scanned spot illumination of the sample 2, which could also be wide-field illuminated.

In the case of a laser scanning microscope 1 the sample 2 is illuminated by means of a provided laser beam 5, which is coupled in by means of a deflecting mirror 6, which does not go beyond what is operationally necessary, and a lens 7 onto a mirror 8. The mirror 8 ensures that the laser beam 5 falls onto an emission filter 9 at a reflection angle. For a better overview of the drawing, only the main axis of the laser beam 5 is shown.

After being reflected from the emission filter 9, the laser beam 5 is deflected biaxially by a scanner 10 and is focussed by means of the lenses 11 and 12 through an objective lens 13 into a spot 14 in the sample 2. In the drawing of FIG. 1, the spot has the shape of a point, but a linear spot is also possible. The fluorescence radiation, excited in the spot 14, passes through the objective lens 13, the lenses 12 and 11 until it reaches again the scanner 10, after a quiescent light beam is present again in the imaging direction. This light beam falls through the emission filters 9 and 15, which have the function of selecting the fluorescence radiation in the spot 14 in terms of its wavelength and, in particular, of separating from the illumination radiation of the laser beam 5, which can be used, for example as the excitation radiation. A lens 16 ensures that the spot 14 is imaged in its entirety into a diffraction-limited image 17, which is located in a detection plane 18. The detection plane 18 is a conjugate plane relative to the plane, in which the spot 14 in the sample 2 is located. The image 17 of the spot 14 is captured by a detector device 19 in the detection plane 18. This detector device will be explained in greater detail below with reference to the FIGS. 2 to 4. What is important at this point is that the detector device 19 spatially resolves the diffraction-limited image 17 of the spot 14 in the detection plane 18.

The control device C controls all of the components of the LSM 1, in particular, the scanner 10 and the detector device 19. The control device records the data of each image 17 for the different scanning positions, analyzes the diffraction pattern of the image and generates a high resolution composite image of the sample 2.

The LSM 1 from FIG. 1 is shown, by way of example, for a single spot, which is scanned onto the sample. However, said LSM can also be used for the scanning according to a line spot, which extends, for example, perpendicular to the drawing plane in FIG. 1. It is also possible to design the LSM 1 in FIG. 1 in such a way that a plurality of adjacent point spots are scanned in the sample. Then their respective single images 17 also lie next to each other in the detection plane 18. Then the detector device 19 is designed accordingly, in order to detect the adjacent single images 17 in the detection plane 18.

Figure 2:
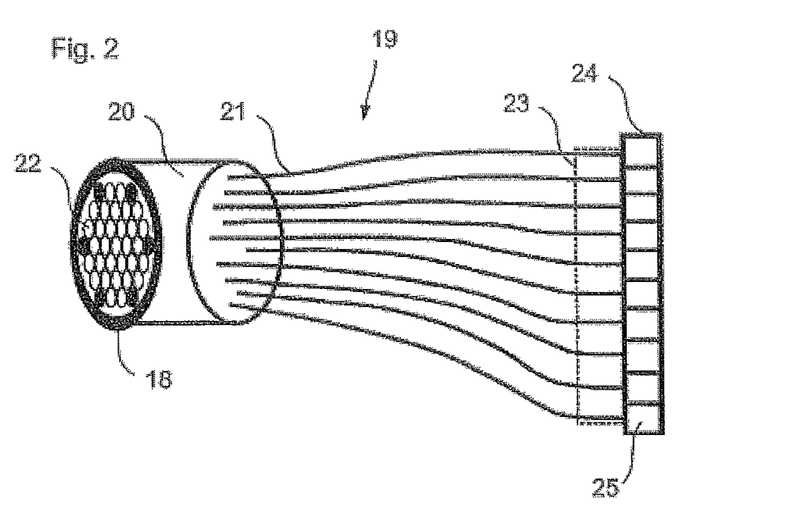
FIG. 2 is an enlarged view of a detector device of the microscope from FIG. 1.

The detector device 19 is shown on a larger scale in FIG. 2. The detector device consists of a fiber optic bundle 20 that feeds a detector array 24. The fiber optic bundle 20 is made of individual optical fibers 21. The ends of the optical fibers 21 form the input 22 to the fiber optic bundle; and this input is located in the detection plane 18. Hence, the individual ends of the optical fibers 21 constitute the pixels, with which the diffraction-limited image 17 of the spot 14 is captured. Since the spot 14 in the embodiment from FIG. 1 is, by way of example, a point spot, the image 17 is an Airy disk, the expansion of which is located inside the circle, which illustrates the detection plane 18 in the FIGS. 1 and 2. Therefore, the expansion of the input 22 to the fiber optic bundle is large enough to cover the expansion of the Airy disk. The individual optical fibers 21 in the fiber optic bundle 20 are brought at their outputs into a different geometrical arrangement than at the input 22 to the fiber optic bundle, i.e., in the form of an elongate plug 23, in which the output-sided ends of the optical fibers 21 are adjacent to each other. The plug 23 is designed in such a way that it matches the geometric arrangement of the detector line 24. That is, each output-sided end of an optical fiber 21 is located exactly in front of a pixel 25 of the detector line 24.

Figure 3:
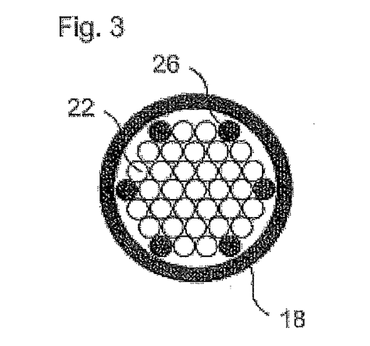
FIGS. 3 and 4 are plan views of possible embodiments of the detector device 19 in a plane of detection.
Figure 4:
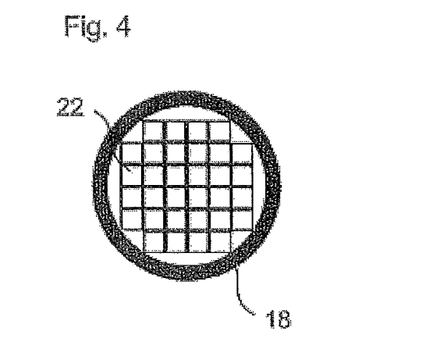

The geometric extent of the redistribution element is very basic, i.e., independently of its implementation, which is achieved by means of a fiber bundle in FIG. 4, adapted at the input to the expansion of the single image (or in the case of a plurality of point spots, adapted to the adjacent single images). The redistribution element has the function of receiving the radiation from the detection plane 18 in such a way that, measured against the scanning theorem, the intensity distribution of the single image 17 is overscanned, based on the diffraction limit. As a result, the redistribution element has pixels, which are located in the detection plane 18 (in the design in FIG. 3 said pixels are formed by the input ends of the optical fibers) and which are smaller by at least a factor of 2 than the smallest resolvable structure resulting from the diffraction limit in consideration of the magnification in the detection plane 18.

It goes without saying that the use of a plug 23 is only one of many possibilities of disposing the output-sided ends of the optical fibers 21 upstream of the pixels 25. Similarly it is possible to use other connections. It is even possible to fuse the individual pixels 25 directly to the optical fibers 21. It is not even necessary to use a detector line 24; instead, a single detector may be used for each pixel 25.

FIGS. 3 and 4 show optional embodiments of the input 22 to the fiber optic bundle. The optical fibers 21 can be fused together at the input 22 to the fiber optic bundle. This approach achieves a higher fill factor. That is, the gaps between the individual optical fibers 21 at the input 22 to the fiber optic bundle can be minimized. On the other hand, fusing generates a degree of cross talk between adjacent optical fibers. If this situation is to be avoided, then the optical fibers may be glued. Even a square arrangement of the ends of the optical fibers 21 is possible, as shown in FIG. 4.

Preferably the individual optical fibers 21 are assigned to the individual pixels 25 of the detector array 24 in such a way that the optical fibers 21, which are adjacent to each other at the input 22 to the fiber optical bundle, also lie side by side at the detector array 24. This procedure minimizes the cross talk between adjacent pixels 25, a phenomenon that can be generated, for example, by the scattered radiation or in the signal processing of the individual pixels 25. If the detector array 24 is a line, then the corresponding arrangement can be achieved by defining the sequence of the individual optical fibers on the detector line by a means of a spiral, which in the plan view of the detection plane 18 connects the individual optical fibers one after the other in succession.

In addition, FIG. 3 shows reactive fibers 26 that are located in the corners of the arrangement of the optical fibers 21 at the input 22 to the fiber optic bundle. These reactive fibers are not guided to the pixels 25 of the detector array. Those locations of the reactive fibers would no longer have the signal intensity that is required to evaluate the signals. This arrangement can be used to reduce the number of optical fibers 21 and, as a result, the number of pixels 25 in the detector line 24 or the detector array in such a way that one can work, for example, with 32 pixels. Such detector lines 24 are already in use elsewhere in laser scanning microscopes, a feature that has the advantage that the electronic system for evaluating the signal need only be provided once in such laser scanning microscopes and is switched over between an already existing detector line 24 and the additional detector line 24, which was added by means of the detector device 19.

According to FIG. 4, optical fibers having a square basic shape are used for the bundle. These optical fibers also exhibit a high degree of coverage in the detection plane and, as a result, collect the radiation efficiently.

Figure 5:
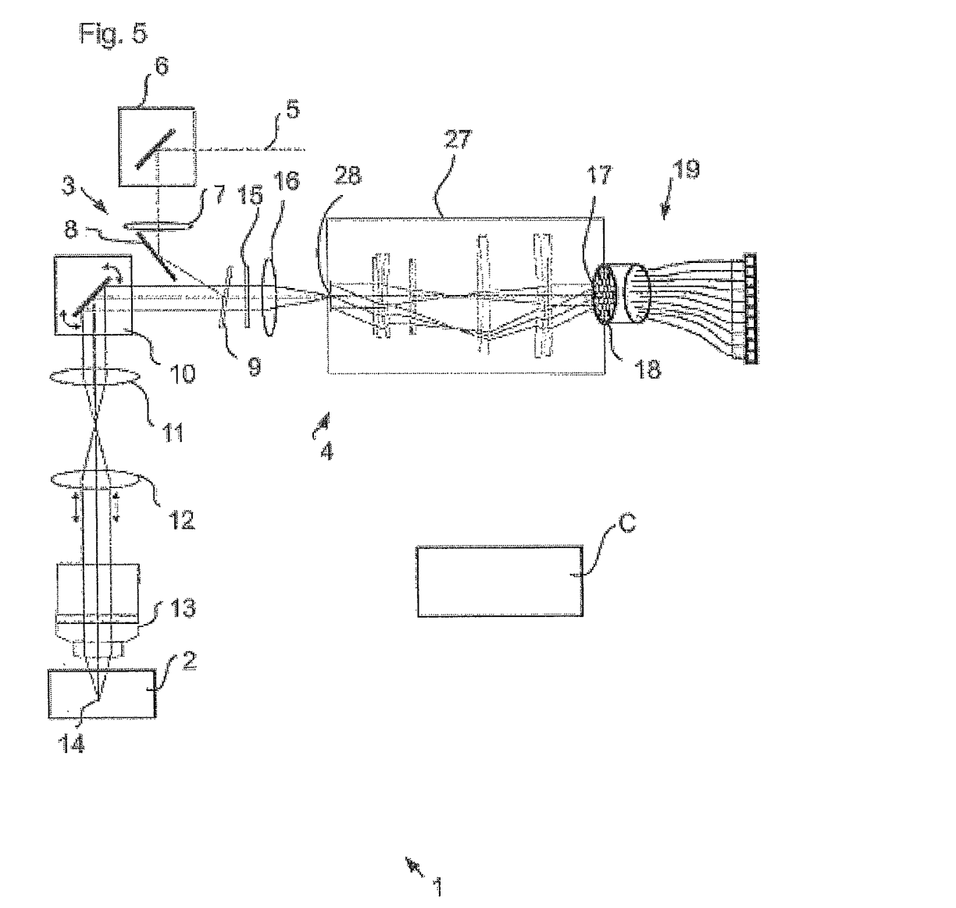
FIG. 5 is a further development of the microscope from FIG. 1 by means of a zoom lens for adjusting the size of the detector field.

FIG. 5 shows a development of the LSM 1 from FIG. 1, where a zoom optical system 27 is disposed upstream of the detection plane 18. The conjugate plane, in which the detection plane 18 was arranged according to the design from FIG. 1, now forms an intermediate image plane 28, from which the zoom optical system 27 receives the radiation and directs to the detection plane 18. The zoom optical system 27 allows the image 17 to be optimally adjusted to the expansion of the input of the detector device 19.

Figure 6:
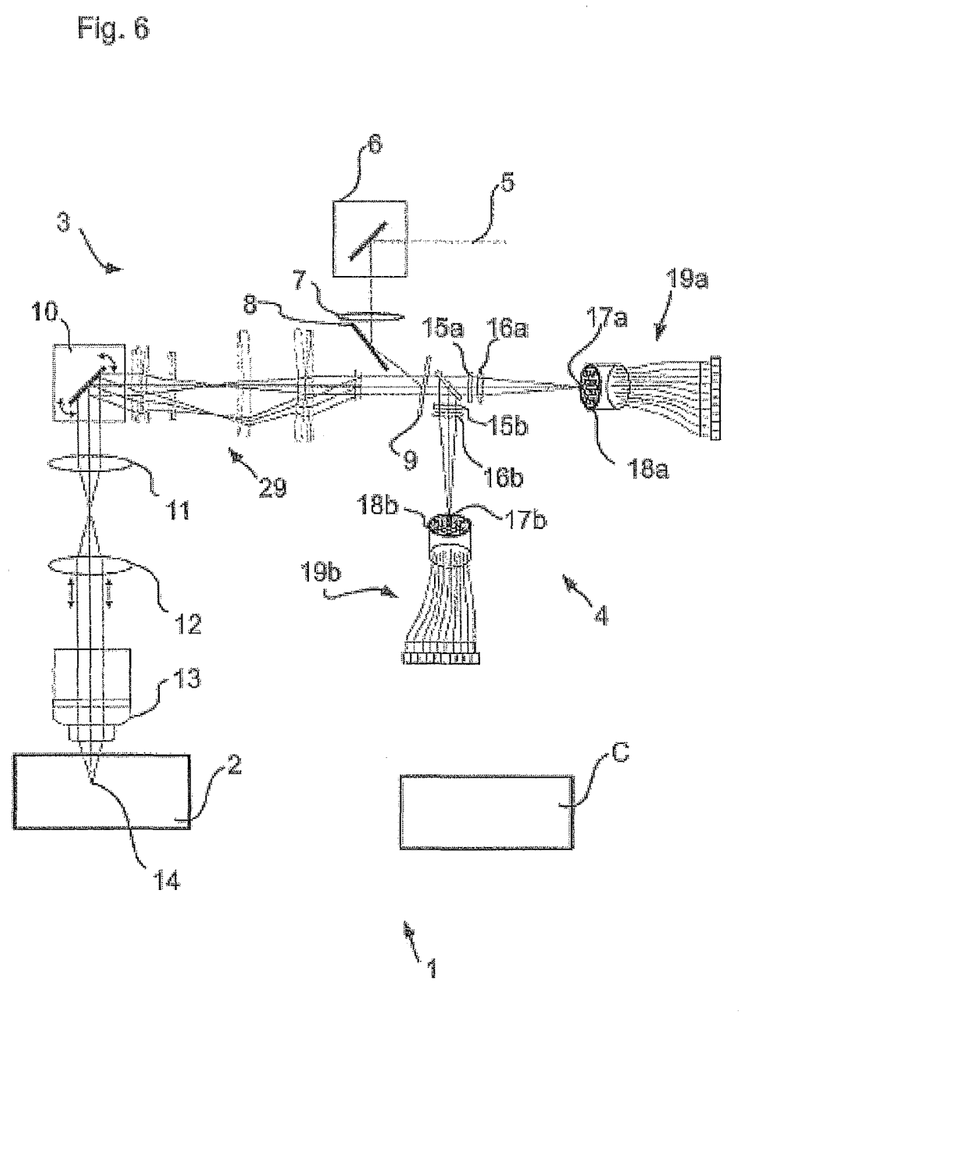
FIG. 6 is a modification of the microscope from FIG. 5 with respect to the zoom optical system as well as with respect to a further development for multi-colored imaging.

FIG. 6 shows an additional modification of the laser scanning microscope 1 from FIG. 1. First of all, in this case the zoom optical system 29 is arranged in such a way that it is in the part of the beam path, through which both the illumination beam path 3 and the imaging beam path 4 pass.

The advantage gained by such a modification is that not only the size of the image 17 on the input side of the detector device 19 can be adjusted, but it is also possible to adjust with respect to the imaging beam path 4 the pupil filling of the objective lens 13 and, therefore, the use of the laser beam 5.

In addition, FIG. 6 also shows the LSM 1 designed as two channels by disposing a beam splitter downstream of the emission filter 9. In this case the beam splitter separates the radiation into two separate color channels. The corresponding elements of the color channels correspond in each instance to the elements, which are arranged downstream of the emission filter 9 in the imaging direction in the LSM 1 from FIG. 1. The color channels are distinguished by the reference suffix "a" or "b" in the drawing in FIG. 6.

Naturally the provision of two color channels is independent of the use of the zoom optical system 29. However, this combination has the advantage that a zoom optical system 27, which would have had to be provided in each one of the two color channels and, as a result, there would have been two such optical systems, need only exist once. However, it goes without saying that the zoom optical system 27 can also be used in the design, according to FIG. 1; and the LSM 1 from FIG. 6 can also be implemented without the zoom optical system 29.

Figure 7:
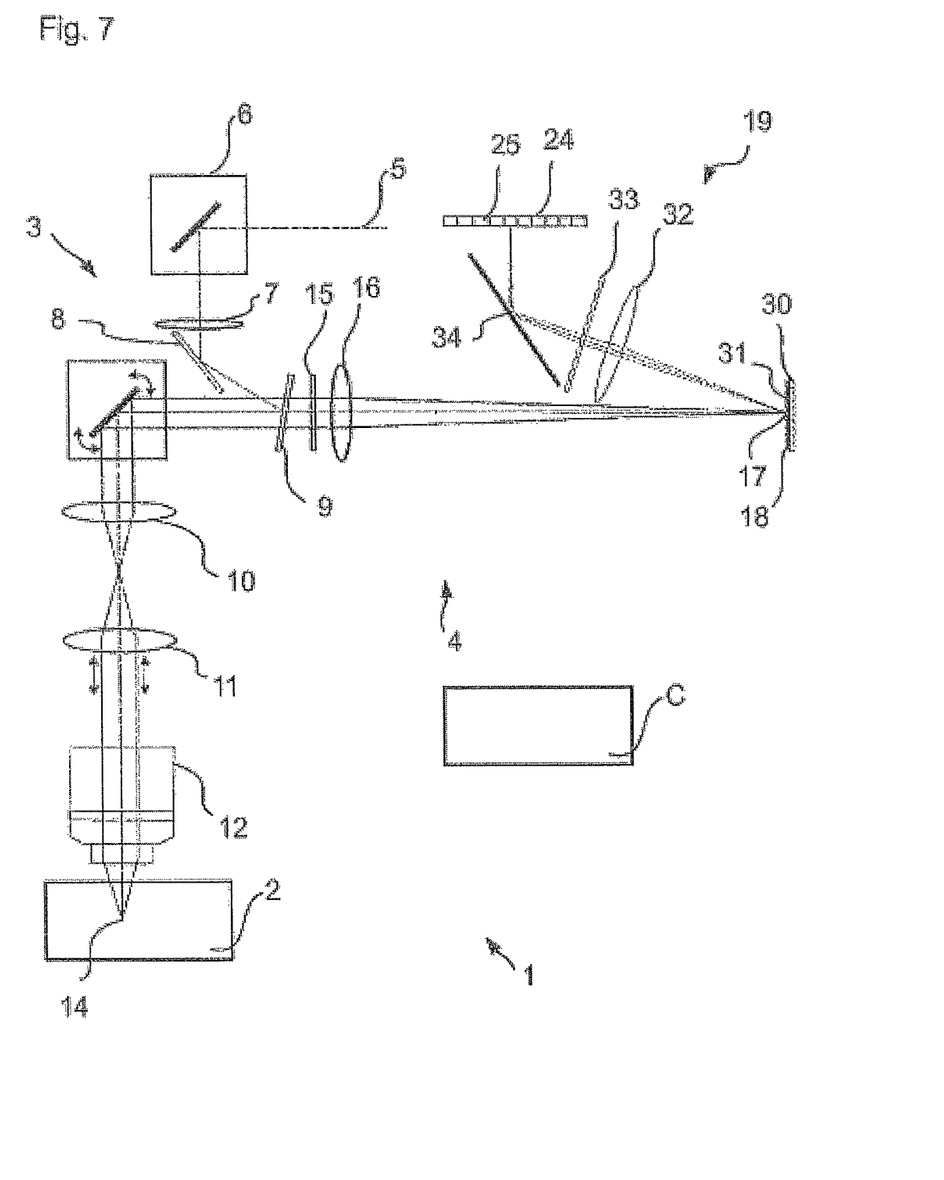
FIG. 7 is a modification of the microscope from FIG. 1, where the modification relates to the detector device.

FIG. 7 shows a modification of the LSM 1 from FIG. 1 with respect to the detector device 19.

At this point the detector device 19 has a multi-faceted mirror 30, which has individual facets 31. The facets 31 correspond with respect to the resolution of the image 17 to the ends of the optical fibers 21 at the input 22 to the fiber optics bundle. The individual facets 31 differ with respect to their tilt relative to the optical axis of the incident radiation. Together with a lens 32 and a mini lens array 33 and a deflecting mirror 34, which is used only for beam folding, each facet 31 images a section of the surface area of the single image 17 onto a pixel 25 of a detector array 24.

Depending on the orientation of the facets 31, the detector array 24 in this case may be preferably a 2D array, but a detector line is also possible.

Figure 8:
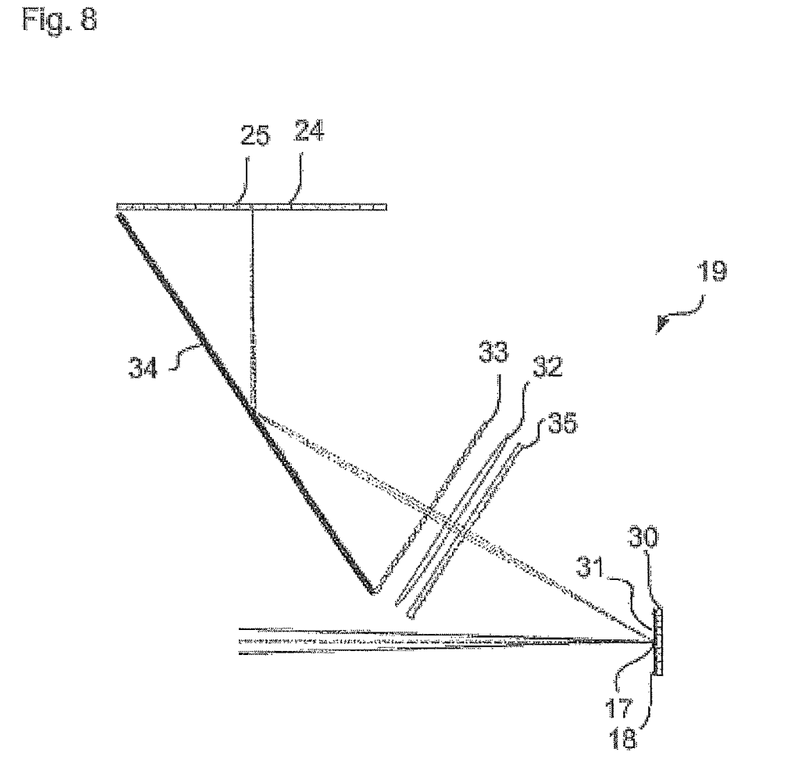
FIG. 8 is a modification of the detector device 19 from FIG. 7.

FIG. 8 shows a further development of the detector device 19 from FIG. 7. In this case a refractive element 35 is also arranged upstream of the lens 32; and this refractive element distributes the radiation very well onto a detector line.

The detector array 24 may be chosen, as stated above, with regard to its geometry, without additional restrictions. Of course, then the redistribution element in the detector device 19 should be adapted to the corresponding detector array. The individual pixels, with which the image 17 is resolved, are no longer defined in terms of their size by the detector array 24, but rather by the element that effected the redistribution of the radiation from the detection plane 18. In the case of an Airy disk the diameter of the disk during diffraction-limited imaging is calculated according to the formula $1.22 \cdot \lambda / NA$, wherein $\lambda$ is the average wavelength of the imaged radiation, and NA is the numerical aperture of the objective lens 13. Then the full width at half maximum is $0.15 \cdot \lambda / NA$. In order to achieve a high resolution, it is sufficient to make the spatial resolution during the detection twice as high as the full width at half maximum. That is, the full width at half maximum is scanned twice. As a result, a facet element 31 and/or an end of an optical fiber 21 at the input 22 to the fiber optic bundle may be at most half as large as the full width at half maximum of the diffraction-limited single image. Naturally this applies, taking into consideration the magnification, which the optical system downstream of the objective lens 13 effected. Therefore, in the simplest case a 4×4 array of pixels in the detection plane 18 per full width at half maximum would no longer suffice.

The zoom optical system, which was explained with reference to FIGS. 5 and 6, allows not only an adjustment such that the diffraction distribution of the diffraction-limited image 17 of the spot 14 optimally fills the input area of the detection device 19, but also allows an additional operating mode, when, in particular, more than one Airy disk is imaged into the detection plane 18. During a measurement, during which more than one Airy disk is imaged onto the detector device 19, light from other depth levels of the sample 2 is detected at the outer pixels of the detector device 19. The net result is that in the course of processing the image, an additional signal strength is obtained without any adverse impact on the depth resolution of the LSM 1. Hence, the zoom optical system 27 or 29 allows a compromise between the signal-to-noise ratio of the image and the depth resolution.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. Microscope for high resolution scanning microscopy of a sample, said microscope comprising,
    an illumination device for illuminating the sample,
    an imaging device for scanning at least one point spot or line spot across the sample and for diffraction-limited imaging the point spot or line spot into a stationary single image in a detection plane,
    a detector device for detecting the single image in the detection plane for different scanning positions with a spatial resolution,
    an evaluation device for evaluating a diffraction pattern of the single image for the scanning positions from data of the detector device and for generating an image of the sample, said image having a resolution that is increased beyond the diffraction limit,
    wherein the detector device has a detector array, which has pixels and is larger than the single image, and a non-imaging redistribution element, which is disposed upstream of the detector array and distributes the radiation from the detection plane in a non-imaging manner among the pixels of the detector array,
    said redistribution element comprising a bundle of optical fibers, said bundle having an input with fiber ends, which is arranged in the detection plane, and an output, at which the optical fibers terminate at the pixels of the detector array in a geometrical arrangement, which is different from that of said input, said input fiber ends defining individual image pixels and said pixels of the detector being larger than the image pixels, and
    wherein said input fiber ends being at most half as large as the full width at half maximum of the diffraction limited single image.

* * * * *